(12) United States Patent
Zimmer et al.

(10) Patent No.: US 6,957,807 B2
(45) Date of Patent: Oct. 25, 2005

(54) DAMPING DEVICE

(75) Inventors: Martin Zimmer, Rheinau (DE); Rainer Thallner, Rheinau (DE); Juergen Ahlfeld, Weissensberg (DE); Wolfgang Mueller, Lustenau (AT)

(73) Assignee: Grass GmbH, Voralberg (AT)

( * ) Notice: Subject to any disclaimer, the term of this patent is extended or adjusted under 35 U.S.C. 154(b) by 0 days.

(21) Appl. No.: 10/743,359

(22) Filed: Dec. 22, 2003

(65) Prior Publication Data

US 2004/0150143 A1    Aug. 5, 2004

(30) Foreign Application Priority Data

Dec. 24, 2002 (DE) ................. 102 61 591

(51) Int. Cl.⁷ ............. F16F 9/02; F16F 9/32; E05F 5/10; E05F 3/02; E05F 5/02
(52) U.S. Cl. ............. 267/64.11; 16/66; 16/86; 267/226; 267/139; 267/34
(58) Field of Search ............. 16/66–70, 84, 16/82, 85, 86, 49; 267/64.11–64.28, 226, 267/34, 124, 139–140, 120, 116, 113, 221; 188/283, 317, 312, 301, 286, 287, 316, 322.22; 312/333, 334.1, 319.1; 293/134; 213/220, 213/223

(56) References Cited

U.S. PATENT DOCUMENTS

| | | |
|---|---|---|
| 2,826,273 A | 3/1958 | Mitchell |
| 2,965,074 A | 12/1960 | Williamson |
| 2,977,146 A * | 3/1961 | Edwards et al. ............. 293/134 |
| 3,053,526 A | 9/1962 | Kendall |
| 3,186,702 A | 6/1965 | Taylor |
| 3,618,928 A | 11/1971 | Taylor |
| 3,628,638 A | 12/1971 | Curchack |
| 3,659,835 A | 5/1972 | Peterson |
| 3,722,640 A | 3/1973 | Taylor |
| 3,762,695 A | 10/1973 | Devost |
| 3,763,971 A | 10/1973 | Saner |
| 3,897,856 A | 8/1975 | Pineau |
| 4,004,794 A | 1/1977 | Jarret et al. |
| 4,040,144 A * | 8/1977 | Lasier et al. ................. 16/66 |
| 4,235,317 A | 11/1980 | Maciejewski |

(Continued)

FOREIGN PATENT DOCUMENTS

DE    19717937    5/1998

(Continued)

OTHER PUBLICATIONS

STIC translation of DE19740143.*

*Primary Examiner*—Douglas C. Butler
(74) *Attorney, Agent, or Firm*—John M. Harrington; Kilpatrick Stockton LLP

(57) ABSTRACT

The invention concerns a damping device for damping the kinetic energy of movable cabinet components, which has a first damping element with a first cylinder that has a first piston, which slides lengthwise in it, and at least one more (second) damping element with a second cylinder that has a second piston, which slides lengthwise in it. Both damping elements are located one behind the other in a serial arrangement and form an integral system. The invention is characterized by the fact that each of the two damping elements are each designed as pneumatic (air) dampers, and a compression chamber and an expansion chamber respectively contain variable volumes; whereby, the damping effects of the damping elements are affected by the guide canals, which control the air distribution and air flow within and between the compression chambers and/or expansion chambers.

13 Claims, 3 Drawing Sheets

U.S. PATENT DOCUMENTS

| | | | |
|---|---|---|---|
| 4,257,581 A | | 3/1981 | Keeler, II |
| 4,262,778 A | | 4/1981 | Flusin |
| 4,284,177 A | | 8/1981 | Domek |
| 4,307,794 A | | 12/1981 | Maciejewski |
| 4,679,775 A | | 7/1987 | Funaki et al. |
| 4,948,103 A | * | 8/1990 | Bowden et al. ............... 267/34 |
| 5,069,317 A | * | 12/1991 | Stoll et al. .................. 188/286 |
| 5,074,389 A | | 12/1991 | Slocum |
| 5,161,653 A | | 11/1992 | Hare |
| 5,169,131 A | | 12/1992 | Shimura |
| 5,477,589 A | * | 12/1995 | Lan .............................. 16/51 |
| 6,553,617 B1 | * | 4/2003 | Salice .......................... 16/85 |
| 2001/0038174 A1 | * | 11/2001 | Muller ...................... 267/221 |
| 2002/0066629 A1 | | 6/2002 | Muller |
| 2003/0089565 A1 | | 5/2003 | Salice |
| 2003/0141638 A1 | * | 7/2003 | Salice ......................... 267/34 |
| 2003/0213663 A1 | | 11/2003 | Salice |
| 2004/0150143 A1 | * | 8/2004 | Zimmer et al. .......... 267/64.11 |
| 2004/0227280 A1 | * | 11/2004 | Booker et al. ........... 267/64.11 |

FOREIGN PATENT DOCUMENTS

| | | | |
|---|---|---|---|
| DE | 019740143 A1 | * | 4/1999 |
| DE | 19915164 | | 10/1999 |
| DE | 10261591 | * | 7/2004 |
| EP | 001433915 A2 | * | 6/2004 |

* cited by examiner

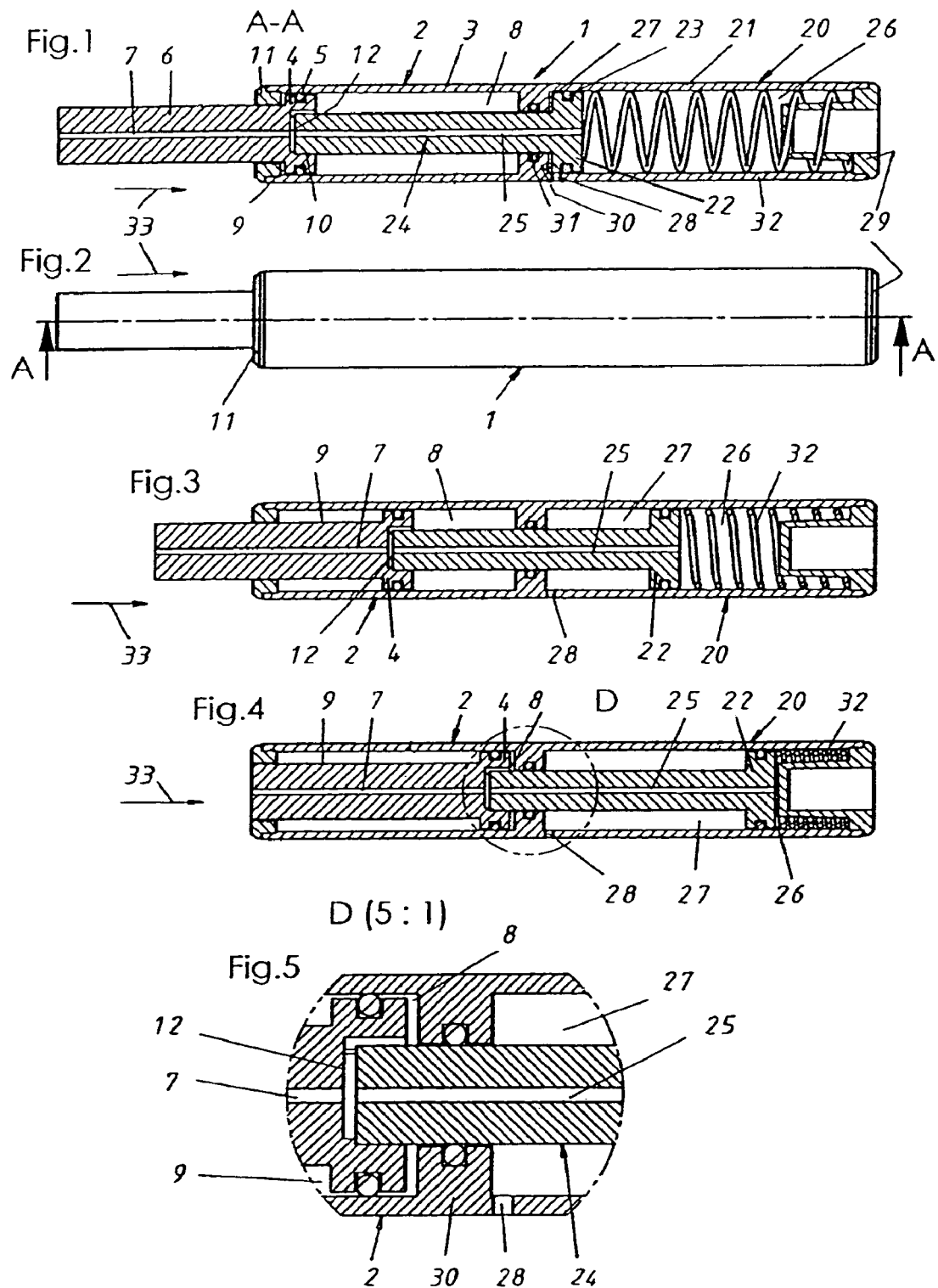

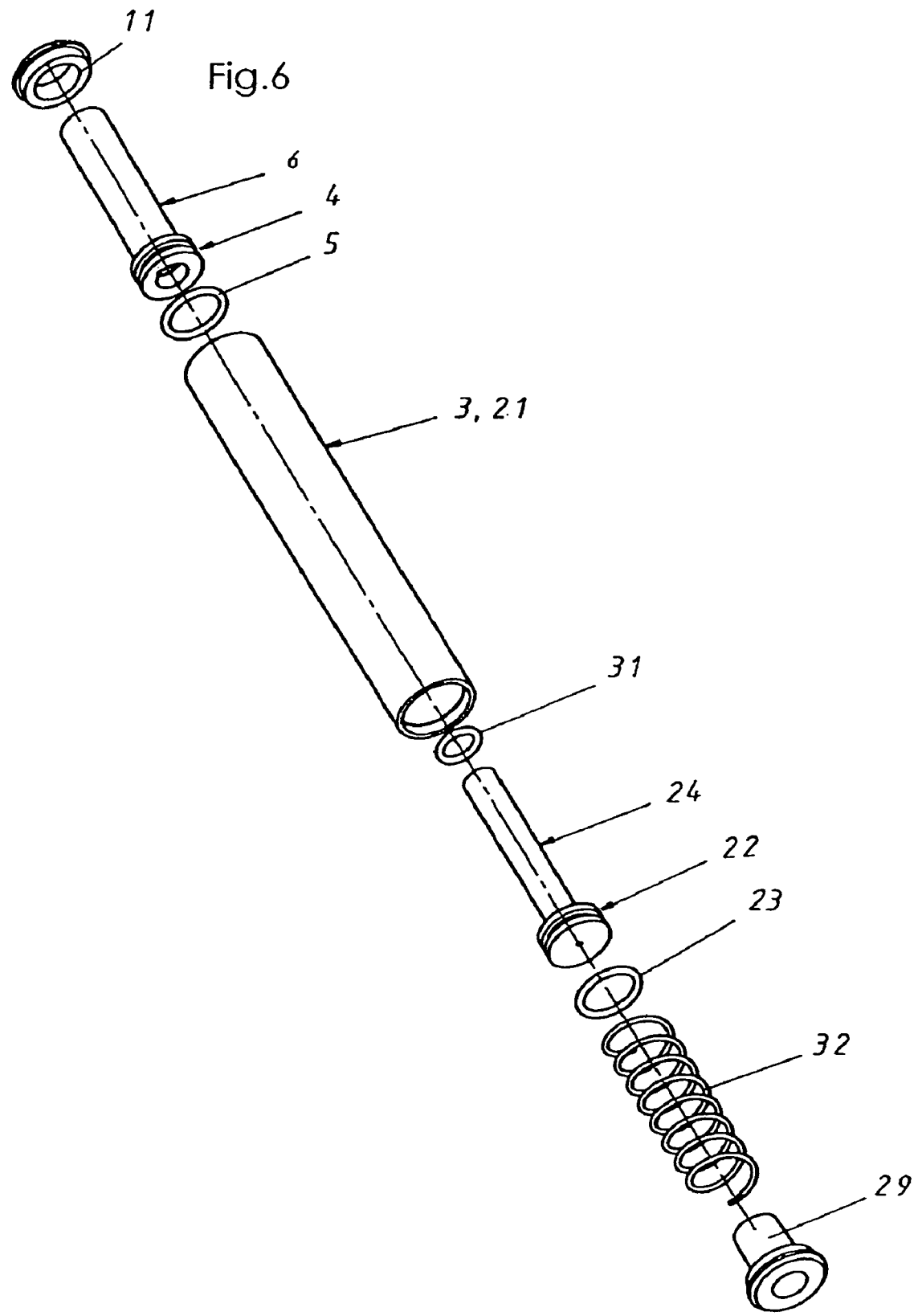

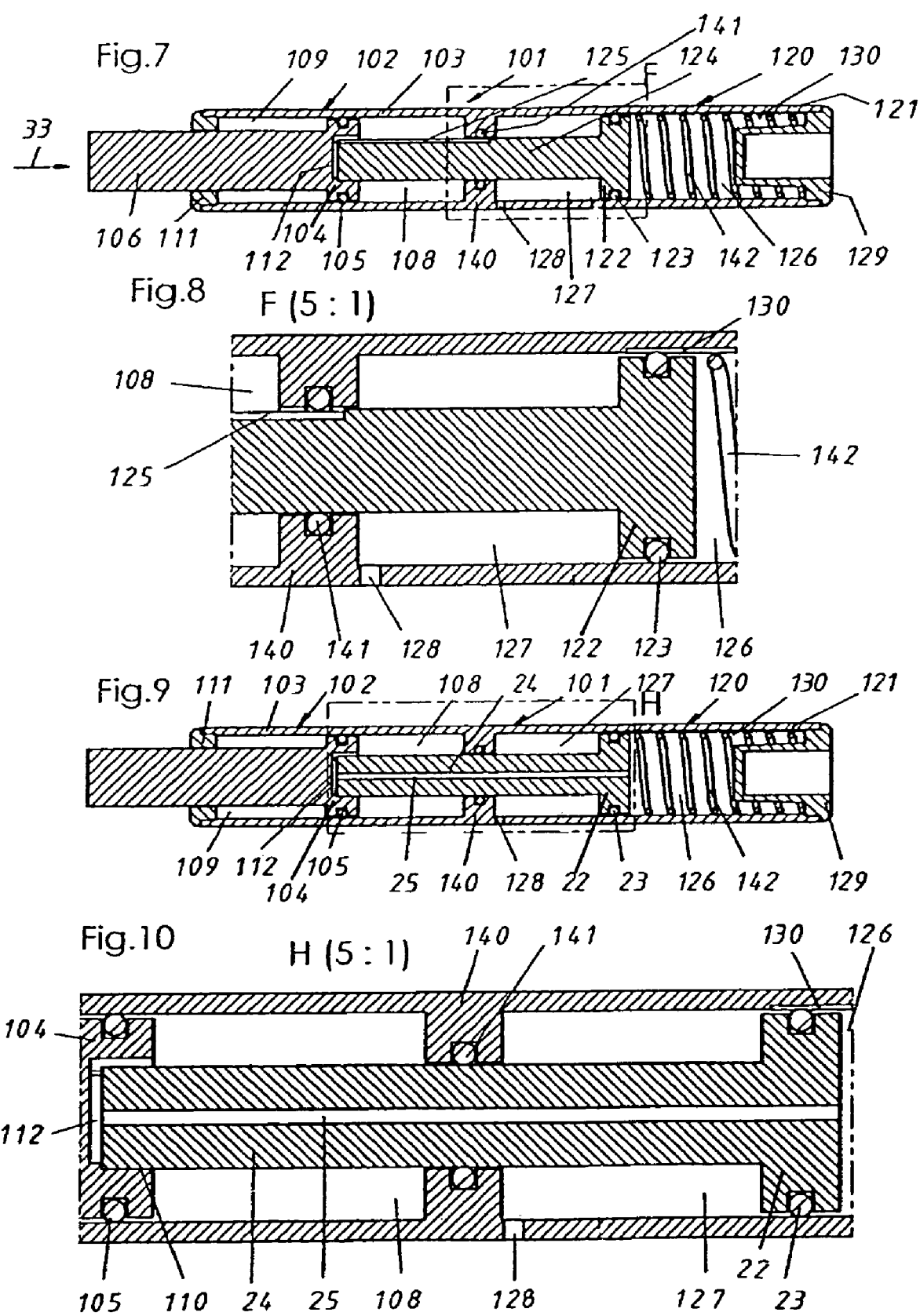

DAMPING DEVICE

FIELD OF THE INVENTION

The invention concerns a damping device, in particular for damping and/or absorbing the kinetic energy of movable cabinet components, as for example, doors, drawers or lifter-doors, according to the characteristics of the introductory clause of the patent claim 1.

BACKGROUND OF THE INVENTION

From the state of technology, damping devices of different designs are well known.

DE 201 17 031 U1 shows a damping device with a fluid medium in the cylinders with pistons and piston rods and a small assembly depth. The cylinders are designed as telescopic cylinders; whereby, the center cylinder serves not only as pistons and not only as pressure cylinders, but also in this last case as pressure and/or working piston. The small overall height causes a large outside diameter and with it a large insertion bore hole. Likewise, the small overall height results in a short operating distance and, therefore, in connection with a fluid medium has a hard damping character. Fluid medium additionally have the disadvantage of having possible leakages. A further disadvantage results from the short slide surfaces and the possible tilting/jamming of the pistons in the cylinder.

DE 202 04 986 U1 shows a damping device that is likewise designed telescopically. The operating distance, however, is substantially longer and so can be more controlled in the damping operation. Also, this avoids tilting and jamming. As is shown in DE 201 17 051 U1, the braking action is attained in two stages. The first stage causes a braking action by means of a spring and the second step causes a damping effect by means of air.

These two-stage operations, which occur one after the other, have the disadvantage if the spring is too strong in the first stage it causes the cabinet component (i.e. a door) to push open again and a spring that is too weak has no effect so that the second stage operation cannot take place at all. A spring that is too strong prevents the door from closing completely. Door, lifter-doors or similar things have varying size masses and different closing speeds. The very unequal kinetic energy that is the result would need different springs for each individual case. In addition, the second stage must have a spring, in order to ensure the total opening position of the system. The second stage, as described, cannot be brought into its opening position with a magnet. A magnet and its accompanying necessary counterpart made of iron, would impact too hard together, thus, nullifying the damping effect.

The task of the invention is to prevent these disadvantages and to create a damper device that results in a large braking and damping effect with a relatively short distance with a small outside diameter.

SUMMARY OF THE INVENTION

The solution of this task takes place according to the invention via the characteristics of patent claim 1.

According to the invention each of the two damping elements are designed as pneumatic dampers and contain a compression chamber and an expansion chamber of variable volumes. The damping effect of the damping elements are affected by the guide canals, which steer the air distribution and air flow within and between the compression chambers and/or expansion chambers.

The resulting advantage is that the damping device can be formed very compactly; it can accommodate a large range of kinetic energy with furniture and cabinets. If necessary, the damping effect can be set/adjusted in a wide range by the corresponding arrangement of the guide canals.

The advantageous embodiments and developments of the invention are given in the dependent claims.

The pistons are led sealed into the cylinders, i.e., with each damping element there is a seal between the largest diameter of the respective piston and the inside diameter of the corresponding cylinder, which seals the respective compression chamber opposite the corresponding expansion chamber.

The pistons of both damping elements are coupled loosely with one another, so that the piston of the first damping element stands directly operation-connected with the pistons of the second damping element during the entire operation distance of the damping device.

Advantageously, the second expansion chamber connects directly on the first compression chamber and is separated from this by a partition. Then the piston rod of the second piston projects through a partition's opening into the first compression chamber so that the front side of the second piston rod is taken up in a respective recess of the first piston.

The first compression chamber is sealed opposite the second expansion chamber; the seal is placed between the piston rod of the second piston and the bore hole of the partition.

Preferably, a spring is located inside the second damping element to operate the resetting force on the damping elements.

To release the air when the damping elements reset and to prevent negative pressure, a second expansion chamber is preferably connected by a ventilation bore hole to the external environment.

The piston rod of the first rod is guided through a cylinder cap into the open, so that the first expansion chamber is connected to the external environment, preferably by a remaining gap that is between the cylinder cap and piston rod, and there the air is released into the open.

In a first special design of the invention the first piston has in the longitudinal direction a guide canal in the form of a through-bore-hole that connects the first compression chamber to the outer environment and during the damping process provides for a controlled air release of the first compression chamber. In the same way the second piston also has in the longitudinal direction a guide canal in the form of a through-bore hole that connects the second compression chamber with the external environment. This air is released in a controlled manner during the operation process.

Preferably, both guide canals are connected, air-guided, to each other so that only the guide canal of the first piston is directly connected to the external environment. Preferably, a leakage air canal is formed in the recess area of the first piston and is connected by the first compression chamber with the first guide canal.

The damping device of the first embodiment is especially suitable for damping masses with relatively little kinetic energy, as for example, a small cabinet door.

In a second design of the invention, a guide canal is located on the outer side and in the longitudinal direction of the second piston rod, going out from its free end. The guide canal extends over a certain length of the piston rod and during a certain section of the second piston's operating distance connects the first compression chamber to the second expansion chamber. During the damping process, the air that is compressed in the first compression chamber can escape by the guide canal and the opening of the second expansion chamber.

In addition, another guide canal is located on the inner wall and in the longitudinal direction of the second cylinder, emanating from the end area of the cylinder, and extends over a certain length of the cylinder and connects, during a certain section of the operating distance of the second piston, the second compression chamber to the second expansion chamber. Thus, also during the damping process the compressed air in the second compression chamber can escape by the guide canal and the opening of the second expansion chamber.

The damping effect of this second design of the invention is greater than the first embodiment. This design is especially suited for damping masses with average kinetic energy, as for example, a drawer or a larger cabinet door.

Finally, in a third design of the invention there is a combination of characteristics and features of the first two embodiments. Here, the second piston that is similarly described in the first embodiment example has in the longitudinal direction a guide canal in the form of a through-bore hole, which connects the first compression chamber to the second compression chamber. As is the case for the second design, a guide canal is located at the inner wall and in the longitudinal direction of the second cylinder, going out from the end area of the cylinder. The guide canal extends over a certain length of the cylinder and during a certain section of the operating distance of the second piston, connects the second compression chamber to the second expansion chamber.

Air is compressed in the first compression chamber during the damping process then escapes into the second compression chamber and, thereby, strengthens and increases completely the compression until the second piston reaches in the area of the guide canal, and the air can then escape to the external environment by the guide canal and by the bore hole of the second expansion chamber.

This design is especially suited, because of the increasingly high compression forces, for braking masses with relatively large kinetic energy, as for example, a large drawer.

With all the designs and embodiments, not only the geometry and the guide canal's diameter are determined, but also the air release bore hole and/or leakage air canals can be included for regulating the damping process.

In the following the presented invention is more closely described by several design methods of the represented drawings. Here, additional characteristics and features fundamental to the invention follow from the drawings and their descriptions.

BRIEF DESCRIPTION OF THE DRAWINGS

FIG. 1: shows a section through a first embodiment of the invention-related damping device;

FIG. 2: shows the side view of the damping device according to FIG. 1;

FIG. 3: shows a section of the damping device, according to FIG. 1, after half the operating distance is reached;

FIG. 4: shows a section of the damping device, according to FIG. 1, after the total operating distance is reached;

FIG. 5: shows an enlarged section D from FIG. 4 with a canal for the compressed air;

FIG. 6: shows an exploded drawing of the damping device, according to FIG. 1;

FIG. 7: shows a second design of the damping device with another layout of the guide canals;

FIG. 8: shows the enlarged section F from FIG. 7;

FIG. 9: shows a third embodiment of the invention;

FIG. 10: shows the enlarged section H from FIG. 9.

DETAILED DESCRIPTION

FIGS. 1 to 6 show a first embodiment of the invention. As shown in FIG. 1, the damping device (1) has two damping elements (2, 20) one located behind the other. Each damping element is designed as a pneumatic damper and includes a cylinder (3, 21) so that both cylinders (3, 21) have a common casing.

Inside the first cylinder (3) is a lengthwise movable first piston (4). Inside the second cylinder (21) is a lengthwise movable second piston (22).

Because of the pistons, each of the cylinder's (3, 21) partitions variable volumes, in each case a compression chamber (8 and/or 26) and in each case an expansion chamber (9 and/or 27). The pistons are guided (4, 22) sealing in the cylinders (3, 21); that means that with each damping element there is a seal (5 and/or 23) between the largest diameter of the respective piston and the inside diameter of the corresponding cylinder, which seals the respective compression chamber (8 and/or 26) opposite the corresponding expansion chamber (9 and/or 27).

The piston rod (6) of the first piston (4) projects through an opening of the cylinder cap (11) into the open, while the piston rod (24) of the second piston, sealed by means of a seal (31) is guided through a partition (30) between both cylinders and is inserted with its front side in a centric recess (10) of the first piston (4). A side view of the damping device is shown in FIG. 2.

FIG. 3 shows the position of the pistons about halfway on the sliding distance. Here, the first piston rod (6) is impinged by a movable cabinet component so that the pistons slide in the direction of the arrow (33) and the air is compressed simultaneously in both compression chambers (8, 26). There is a through-bore-hole on each piston (4, 22) that is formed as a guide canal (7 and/or 25). The air compressed in the compression chambers (8, 26) can escape in a controlled manner by means of the guide canals (7, 25). The air in the second compression chamber (26) reaches directly into the centric bore hole (25) of the second piston (22) while the air of the first chamber (8) flows by a canal (12) into the first piston (4) in the centric piston rod bore hole (FIG. 5). At the same time in the second expansion chamber, the existing negative pressure pulls the air through an opening (28) and can be additionally controlled by changing this opening. The existing negative pressure in the first expansion chamber pulls leakage air through a gap (clearance) between the first piston rod (4) and the cylinder cap (11).

FIGS. 4 and 5 show both pistons (4, 22) in their end position. The resetting of the pistons (4, 22) after a damping process into their initial position is made by a compression spring (32), which is located in the second chamber between the bottom of the second piston (22) and the cylinder bottom (29).

FIG. 6 shows an exploded drawing of the damping device in the first design.

FIGS. 7 and 8 show a second design of the invention. In this design of the invention, there is a guide canal (125) on the outside and in the longitudinal direction of the second piston rod (124) going out from its free end and it extends over a certain length of the piston rod (124) and during a certain section of the operating distance of the second piston (122) connects the first compression chamber (108) with the second expansion chamber (127). During the damping process, the compressed air in the first compression chamber (108) can escape by the guide canal (125) and the opening (128) of the second expansion chamber (127).

In addition, another guide canal (130) is on the inner wall and in the longitudinal direction of the second cylinder (121), going out from the end area of the cylinder, which extends over a certain length of the cylinder (121) and, during a certain section of the operating section of the second piston, connects the second compression (126) with the second expansion chamber (127). Thus, air compressed during the damping process in the second compression chamber (126) can escape by the guide canal (130) and the opening (128) of the second expansion chamber (127).

Both guide canals (125, 130) have a certain length, so that the point of application of the air release of the compression chambers (108, 126) can be guided purposefully. The respective length of the guide canals (125, 130) determines the time point of the damping effect and the quantity of the air flowing through; that is, the intensity of the damping.

Finally FIGS. 9 and 10 show a third embodiment of the invention. Here, the second piston (24) has (similar to the one described in the first embodiment) in the longitudinal direction a guide canal (25) that is formed as a through-bore-hole, which connects the first compression chamber (108) to the second compression chamber (126). Similar to the second design, a guide canal (130) is located on the inside wall and in the longitudinal direction of the second cylinder (121), going out from the end area of the cylinder. The guide canal extends over a certain length of the cylinder (121) and, during a certain section of the operating distance of the second piston (22), connects the second compression chamber (126) to the second expansion chamber (127).

This especially becomes clear in FIG. 10. The compressed air flows from the first compression chamber (127) by means of the canal (124) in the first piston (104) into the axial guide canal (25) in the second piston (22) and arrives into the second compression chamber (126). The compression in the second compression chamber (126) is thereby increased until the second piston (24) reaches the guide canal (130) area and the air can flow by the guide canal (130) in the cylinder wall behind the pistons into the second expansion chamber (127) and can flow further by the opening (128) into the open.

List of References
1 Damping device
2 First damping element
3 Cylinder
4 Piston
5 Seal
6 Piston rod
7 Guide canal
8 Compression chamber
9 Expansion chamber
10 Recess
11 Cylinder cap
12 Air canal
20 Second damping element
21 Cylinder
22 Piston
23 Seal
24 Piston rod
25 Guide canal
26 Compression chamber
27 Expansion chamber
28 Bore hole
29 Cylinder bottom
30 Partition
31 Seal
32 Compression spring
33 Direction of arrow
101 Damping device
102 First damping element
103 Cylinder
104 Piston
105 Seal
106 Piston rod
108 Compression chamber
109 Expansion chamber
110 Recess
111 Cylinder cap
112 Air canal
120 Second damping element
121 Cylinder
122 Piston
123 Seal
124 Piston rod
125 Guide canal
126 Compression chamber
127 Expansion chamber
128 Bore hole
129 Cylinder bottom
130 Guide canal
140 Partition
141 Seal
142 Compression spring

What is claimed is:

1. Damping device for damping the kinetic energy of at least one movable cabinet component, comprising:
   a first damping element with a first cylinder that has a first piston having a first piston rod, which slides lengthwise in the first cylinder, and while in an extended position, the first piston rod extends outward from the first cylinder;
   at least one second damping element with a second cylinder that has a second piston having a second piston rod, which slides lengthwise in the second cylinder;
   wherein the damping elements are located one behind the other in a serial arrangement and form an integral system; each of the damping elements is designed as a pneumatic damper, and each one has a compression chamber and an expansion chamber that have variable volumes, said expansion chamber of the second damping element disposed entirely rearward of the compression chamber of the first damping element; and each piston and piston rod has a guide conduit, which controls air distribution and air flow within and between at least one of the respective compression chambers, the respective expansion chambers, and the respective compression and expansion chambers, and which affects damping effects of the damping elements.

2. Damping device, according to claim 1, wherein each damping element has a seal between an outer circumference of the respective piston and an inner circumference of the corresponding cylinder.

3. Damping device, according to claim 2, wherein the first piston of the first damping element is operably connected to the second piston rod of the second damping element during a predetermined operating distance of the damping device.

4. Damping device, according to claim 3, wherein the expansion chamber of the second damping element is separated from the compression chamber of the first damping element by a partition.

5. Damping device, according to claim 4, wherein the second piston rod of the second piston projects through an opening in the partition into the compression chamber of the first damping element so that a front side of the second piston rod of the second piston is taken up into a respective recess of the first piston.

6. Damping device, according to claim 5, wherein a seal is provided between the second piston rod of the second piston and the opening in the partition.

7. Damping device, according to claim 6, wherein a spring is located in the second damping element in order to affect a resetting force on the damping elements.

8. Damping device, according to claim 7, wherein the expansion chamber of the second damping element is in communication with an external environment by an opening formed in the expansion chamber of the second damping element.

9. Damping device, according to claim 8, wherein the first piston rod of the first piston is guided through a cylinder cap into the external environment whereby, the expansion chamber of the first damping element is in communication with the external environment by a remaining gap between the cylinder cap and the first piston rod.

10. Damping device, according to claim 9, wherein the guide conduit of the first piston and first piston rod further comprises a bore-hole extending longitudinally through the first piston and first piston rod, by which the compression chamber of the first damping element is in communication with the external environment.

11. Damping device, according to claim 10, wherein the guide conduit of the second piston and second piston rod further comprises a bore-hole extending longitudinally through the second piston and second piston rod by which the compression chamber of the second damping element is in communication with the external environment.

12. Damping device, according to claim 11, wherein the guide conduits of the first and second pistons and piston rods are in communication with one another.

13. Damping device, according to claim 12, further comprising a leakage conduit formed in the recess of the first piston by which the compression chamber of the first damping element is in communication with the guide conduit of the first piston.

* * * * *